United States Patent
Fandrei, II

(10) Patent No.: US 9,737,933 B2
(45) Date of Patent: Aug. 22, 2017

(54) PROCESS OF FABRICATING A SHIELD AND PROCESS OF PREPARING A COMPONENT

(71) Applicant: GENERAL ELECTRIC COMPANY, Schenectady, NY (US)

(72) Inventor: Theodore William Fandrei, II, Latham, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 776 days.

(21) Appl. No.: 13/630,644

(22) Filed: Sep. 28, 2012

(65) Prior Publication Data

US 2014/0093365 A1    Apr. 3, 2014

(51) Int. Cl.
*F01D 1/02*     (2006.01)
*B23K 15/00*    (2006.01)
(Continued)

(52) U.S. Cl.
CPC ............. *B22F 7/06* (2013.01); *B23K 1/0018* (2013.01); *B23K 9/167* (2013.01); *B23K 10/02* (2013.01); *B23K 15/0046* (2013.01); *B23K 26/32* (2013.01); *B23P 15/04* (2013.01); *C23C 4/00* (2013.01); *C23C 4/04* (2013.01); *C23C 6/00* (2013.01); *C23C 24/00* (2013.01); *C23C 24/02* (2013.01); *C23C 24/06* (2013.01); *C23C 24/08* (2013.01); *C23C 28/00* (2013.01); *F01D 5/28* (2013.01); *F01D 5/286* (2013.01); *F01D 5/288* (2013.01); *B22F 2998/10* (2013.01); *B23K 2201/001* (2013.01); *B23K 2203/02* (2013.01); *B23K 2203/08* (2013.01); *B23K 2203/18* (2013.01); *B23K 2203/26* (2015.10); *F05D 2300/175* (2013.01)

(58) Field of Classification Search
CPC ......... B32B 15/00; B32B 15/01; B32B 15/04; B32B 2571/02; B32B 2459/00; B32B 2603/00; C23C 4/00; C23C 4/04; C23C 4/06; C23C 6/00; C23C 24/00; C23C 24/02; C23C 30/00; C23C 30/005; C23C 24/08; C23C 24/06; C23C 28/00; Y10T 428/12944; Y10T 428/12931; Y10T 428/12937; Y10T 428/12854; Y10T 428/12271; Y10T 428/12264; Y10T 428/12229; Y10T 428/12354; Y10T 428/12361; Y10T 428/2495; Y10T 428/24967

See application file for complete search history.

(56) References Cited

U.S. PATENT DOCUMENTS 3,667,241 A    6/1972  Zeh et al.
3,697,191 A    10/1972 Heymann
(Continued)

*Primary Examiner* — Michael E La Villa
(74) *Attorney, Agent, or Firm* — McNees Wallace & Nurick LLC

(57) ABSTRACT

A process of fabricating a shield, a process of preparing a component, and an erosion shield are disclosed. The process of fabricating the shield includes forming a near-net shape shield. The near-net shape shield includes a nickel-based layer and an erosion-resistant alloy layer. The nickel-based layer is configured to facilitate secure attachment of the near-net shaped to a component. The process of preparing the component includes securing a near-net shape shield to a substrate of a component.

12 Claims, 3 Drawing Sheets

(51) Int. Cl.
*B23K 28/00* (2006.01)
*B23K 1/19* (2006.01)
*B23K 26/20* (2014.01)
*B23K 9/16* (2006.01)
*B22F 3/02* (2006.01)
*B22F 3/12* (2006.01)
*B22D 17/00* (2006.01)
*B22F 7/06* (2006.01)
*C23C 24/02* (2006.01)
*C23C 24/00* (2006.01)
*C23C 4/00* (2016.01)
*C23C 6/00* (2006.01)
*C23C 4/04* (2006.01)
*C23C 24/06* (2006.01)
*C23C 28/00* (2006.01)
*C23C 24/08* (2006.01)
*F01D 5/28* (2006.01)
*B23K 1/00* (2006.01)
*B23K 9/167* (2006.01)
*B23K 10/02* (2006.01)
*B23K 26/32* (2014.01)
*B23P 15/04* (2006.01)
*B23K 101/00* (2006.01)
*B23K 103/08* (2006.01)
*B23K 103/02* (2006.01)
*B23K 103/18* (2006.01)

(56) References Cited

U.S. PATENT DOCUMENTS

| | | | |
|---|---|---|---|
| 3,794,445 A | 2/1974 | Kobayashi et al. | |
| 3,839,105 A | 10/1974 | Dewitt | |
| 3,859,005 A | 1/1975 | Huebner et al. | |
| 3,923,415 A | 12/1975 | Benedict et al. | |
| 4,103,749 A | 8/1978 | Erickson | |
| 4,130,373 A | 12/1978 | Giles | |
| 4,164,102 A | 8/1979 | Lohrum et al. | |
| 4,165,949 A | 8/1979 | Riollet | |
| 4,172,984 A | 10/1979 | Daugherty et al. | |
| 4,342,542 A | 8/1982 | Tan et al. | |
| 4,389,439 A | 6/1983 | Clark et al. | |
| 4,402,764 A | 9/1983 | Clark | |
| 4,422,648 A | 12/1983 | Eaton et al. | |
| 4,565,495 A | 1/1986 | MacLeod | |
| 4,622,819 A | 11/1986 | Draper et al. | |
| 4,656,099 A | 4/1987 | Sievers | |
| 4,776,765 A | 10/1988 | Sumner | |
| 4,826,401 A | 5/1989 | Clark et al. | |
| 4,842,663 A | 6/1989 | Kramer et al. | |
| 4,850,717 A | 7/1989 | Clark et al. | |
| 4,971,624 A | 11/1990 | Clark | |
| 5,025,630 A | 6/1991 | Marjollet et al. | |
| 5,030,064 A | 7/1991 | Usami et al. | |
| 5,049,716 A | 9/1991 | Dunmire et al. | |
| 5,087,477 A | 2/1992 | Giggins et al. | |
| 5,112,187 A | 5/1992 | Davids et al. | |
| 5,120,613 A | 6/1992 | Basler | |
| 5,183,390 A | 2/1993 | Amos et al. | |
| 5,190,598 A | 3/1993 | Qureshi | |
| 5,249,918 A | 10/1993 | Knorowski | |
| 5,262,245 A | 11/1993 | Ulion et al. | |
| 5,295,301 A | 3/1994 | Knorowski | |
| 5,351,395 A | 10/1994 | Crawmer et al. | |
| 5,511,308 A | 4/1996 | Ng et al. | |
| 5,573,604 A | 11/1996 | Gerdes | |
| 5,575,145 A | 11/1996 | O'Neill et al. | |
| 5,601,652 A | 2/1997 | Mullin et al. | |
| 5,641,375 A | 6/1997 | Nitescu et al. | |
| 5,683,825 A | 11/1997 | Bruce et al. | |
| 5,780,171 A | 7/1998 | Nissley et al. | |
| 5,822,852 A * | 10/1998 | Bewlay et al. | 29/889.1 |
| 5,951,254 A | 9/1999 | Sikorski et al. | |
| 5,985,127 A | 11/1999 | Greenslade | |
| 6,004,102 A | 12/1999 | Kuefner et al. | |
| 6,019,575 A | 2/2000 | Boursy | |
| 6,047,539 A | 4/2000 | Farmer et al. | |
| 6,102,656 A | 8/2000 | Nissley et al. | |
| 2002/0044238 A1 | 4/2002 | Lee | |
| 2002/0066531 A1 | 6/2002 | Ke et al. | |
| 2003/0034866 A1 | 2/2003 | Skinner et al. | |
| 2005/0166397 A1* | 8/2005 | Ng | 29/889.1 |
| 2006/0289496 A1* | 12/2006 | Kelly | B22F 7/06 219/679 |
| 2007/0137827 A1* | 6/2007 | Vogt et al. | 164/113 |
| 2008/0213617 A1* | 9/2008 | Taylor et al. | 428/603 |
| 2010/0237134 A1* | 9/2010 | Bucci et al. | 228/119 |
| 2015/0086376 A1* | 3/2015 | Fandrei, II | 416/224 |

\* cited by examiner

PROCESS OF FABRICATING A SHIELD AND PROCESS OF PREPARING A COMPONENT

FIELD OF THE INVENTION

The present invention is directed to processes of fabricating and preparing manufactured components and to manufactured components. More specifically, the present invention is directed to protection of iron-based and nickel-based substrates.

BACKGROUND OF THE INVENTION

Components in power generation systems, such as the turbine rotor blades and the turbine stator blades, are used in turbine equipment and can be exposed to an erosive environment, resulting in erosion caused by water droplets, for example, in steam and/or by fine dust from oxide scale. In particular, water droplets can cause erosion of rear-stage turbine blades, where such water droplets are mixed with the steam for turbine driving. Erosion of turbine blades is problematic because it results in blade thinning and fatigue breakdown of the blade brought about by erosion.

Various erosion preventative measures have been implemented to try to increase the durability of turbine components against erosion. One of these preventative measures involves methods that use low heat-input build-up welding with a high energy-density heat source, such as laser beams to build up a plurality of single layers on the turbine component.

Known build-up welding techniques take a significant amount of time to produce the desired erosion protection layer. Another problem with using such build-up techniques is that the erosion layer must also be machined after formation to the desired blade geometry, increasing processing steps and time in manufacturing, thereby increasing costs.

Some build-up welding techniques use STELLITE®, a cobalt-chromium alloy available from Deloro Stellite Holdings Corporation of Goshen, Ind. Use of STELLITE® can cause several undesirable features, such as, forming a complex carbon dilution layer, creating issues for welding operations, causing cracking under high-temperatures along build-up welded portions, creating a need for significant machining to get to a desired component size/geometry, or combinations thereof.

Another preventative measure is to use an erosion shield, for example, including STELLITE®. The erosion shield is secured to the turbine component and protects the component from erosion. Materials for such erosion shields are provided in wrought condition, requiring processing and/or machining to achieve desired sizes and/or geometries. Such processing and/or machining is especially expensive for complex shapes, such as turbine blades or airfoils.

A process of producing or fabricating a shield, a process of preparing a component, and an erosion shield that do not suffer from one or more of the above drawbacks would be desirable in the art.

BRIEF DESCRIPTION OF THE INVENTION

In an exemplary embodiment, a process of fabricating a shield includes forming a near-net shape shield. The near-net shape shield includes a nickel-based layer and an erosion-resistant alloy layer. The nickel-based layer is configured facilitate secure attachment of the near-net shaped to a component.

In another exemplary embodiment, a process of preparing a component includes securing a near-net shape shield to a substrate of a component. The near-net shape shield comprises a nickel-based layer and an erosion-resistant alloy layer positioned at least partially on the nickel-based layer.

In another exemplary embodiment, a near-net shape shield includes a nickel-based layer and an erosion-resistant alloy layer positioned at least partially on the nickel-base layer. The near-net shape shield is configured to be positioned on a turbine component.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided is an exemplary process of fabricating a shield, a process of preparing a component, and an erosion shield. Embodiments of the present disclosure permit lower cost production of components and/or erosion shields, permit production of more reproducible turbine components and/or erosion shields, permit production within narrower tolerances/specifications, permit cost-effective production of complex-shaped components and/or shields (for example, those having cavities, non-parallel surfaces, round/curved surfaces, angled surfaces, protrusions, gaps, or other difficult to form shapes/geometries), reduce or eliminate processing, machining, and/or finishing, permit production of near-net shape or net shape components and/or erosion shields, permit use of materials that are more readily available than those required by other techniques, permit an increase in production rates/speed, permit use of materials that are not available in wrought form, or combinations thereof.

Figure 1:
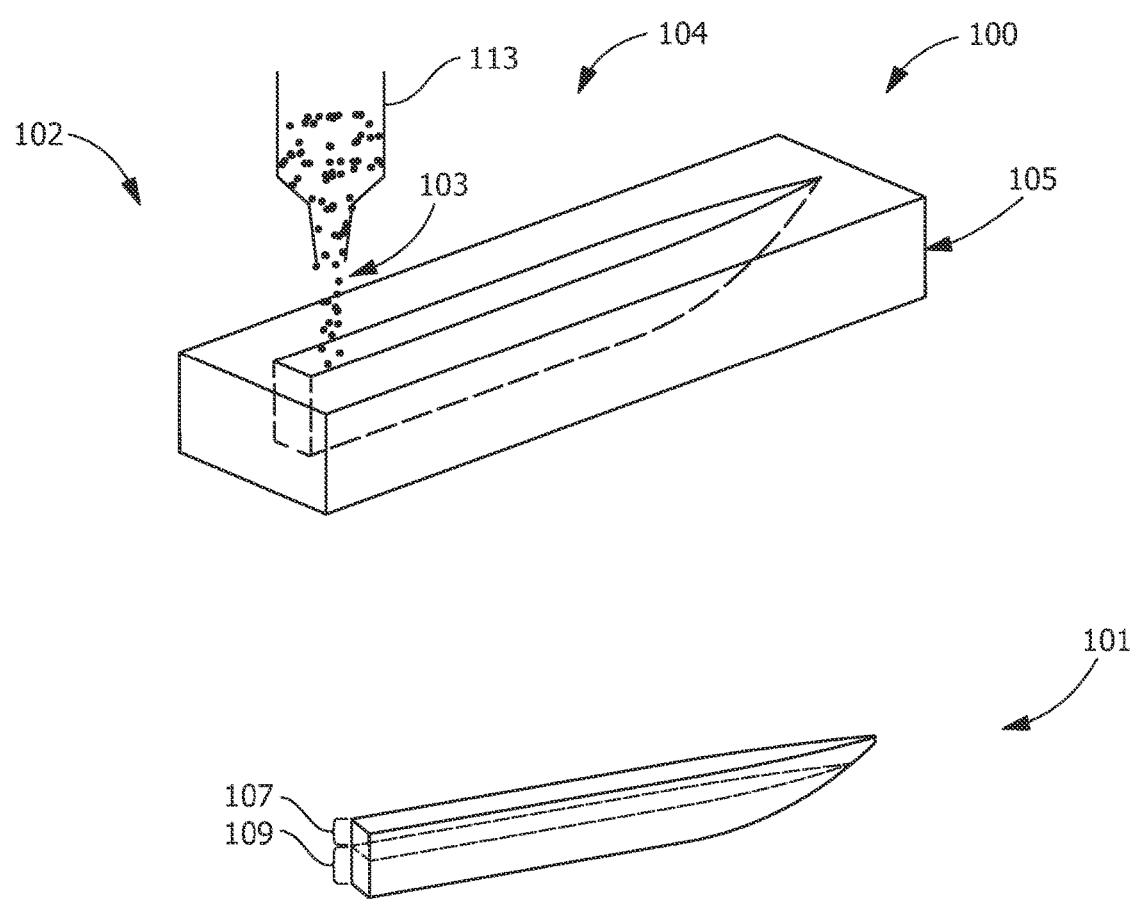
FIG. 1 is a perspective schematic view of an exemplary fabrication process to produce an exemplary erosion shield according to the disclosure.

FIG. 1 represents an embodiment of a fabrication process 100 for fabricating an erosion shield 101. The fabrication process 100 includes forming (step 102) the shield 101 as a near-net shape shield. As used herein, the phrase "near-net" refers to being of a geometry and size requiring little or no machining and processing. In a further embodiment, the shield 101 is a net shape shield. As used herein, the phrase "net" refers to being of a geometry and size requiring no machining and processing.

The shield 101 includes any suitable geometric features capable of being formed by use of a die 105. Suitable geometric features include, but are not limited to, cavities, non-parallel surfaces, round/curved surfaces, angled surfaces, protrusions, gaps, or other difficult to form shapes/geometries. In one embodiment, the geometric features of the shield 101 substantially correspond or completely correspond with all or a portion of a component 201 (see FIG. 2) to be protected by the shield 101.

Figure 3:
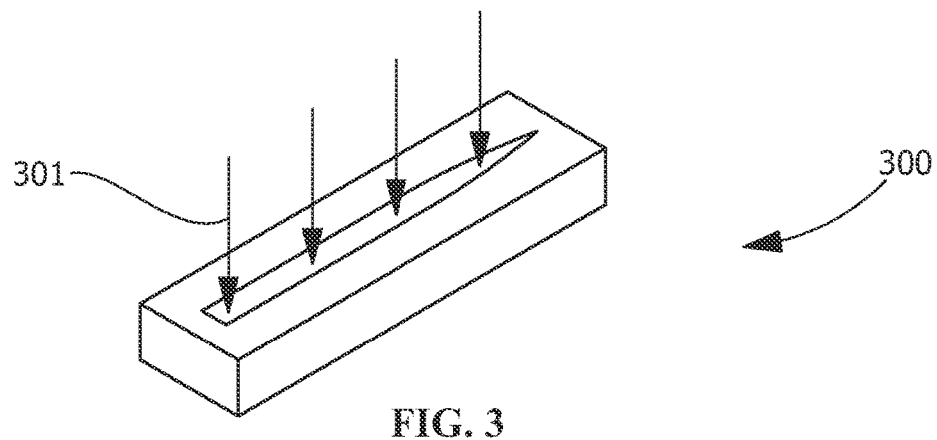
FIG. 3 is a perspective schematic view of a pressing step in an exemplary fabrication process to produce an exemplary erosion shield according to the disclosure.
Figure 4:
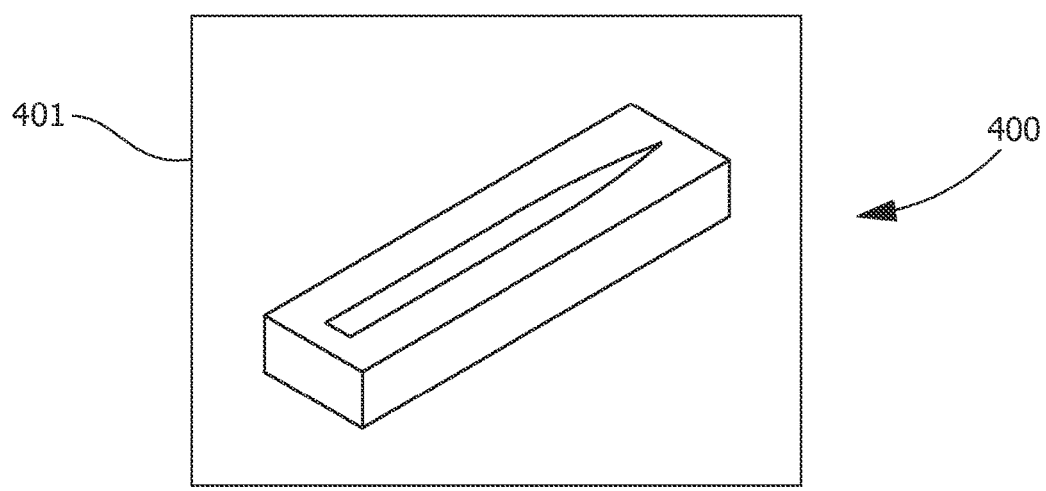
FIG. 4 is a perspective schematic view of a sintering step in an exemplary fabrication process to produce an exemplary erosion shield according to the disclosure.

Referring to FIG. 1, in one embodiment, the forming (step 102) of the shield 101 includes positioning/applying (step 104) material 103 into the die 105. The die 105 includes any suitable geometry capable of forming the geometric features of the shield 101 and containing the material 103. The material 103 is positioned/applied (step 104) in the die 105, for example, by an applicator 113 spraying (such as, thermal spraying and/or cold spraying), die casting, pouring, dripping, flowing, any suitable other application technique, or a combination thereof. In further embodiments, as shown in FIG. 3, the forming (step 102) of the shield 101 includes pressing (step 300) by application of force 301 and/or pressure, for example, to densify the material 103, and/or sintering (step 400), for example as shown in FIG. 4, to achieve a predetermined density, such as fully dense making the shield 101. In a further embodiment, the sintering (step 400) is performed within a furnace 401, for example, at a temperature of between about 1450° F. and about 2100° F. In one embodiment, the pressing (300) includes compression of more than one layer of the shield 101, for example, a nickel-based layer 107 (which may be referred to as a shim) and an erosion-resistant layer 109. In a further embodiment, the sintering (step 400) is under pressure, as well as being at the temperature, for example, as hot pressing or hot isostatic pressing.

Figure 5:
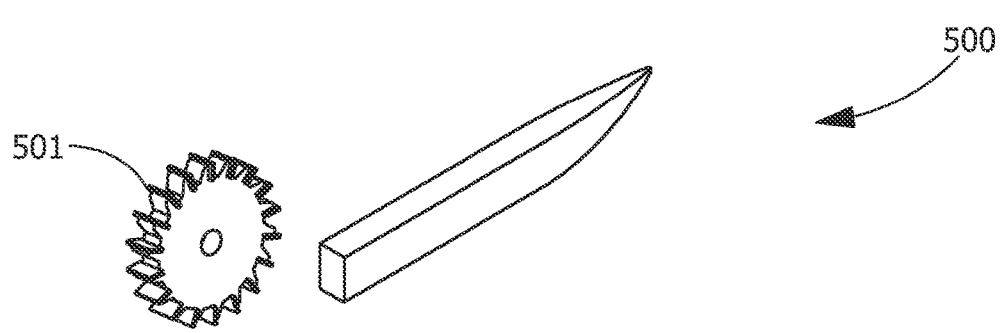
FIG. 5 is a perspective schematic view of a finishing step in an exemplary fabrication process to produce an exemplary erosion shield according to the disclosure.

Further embodiments include finishing (step 500), for example as shown in FIG. 5, with a tool 501, such as by machining, sanding, grit-blasting, cutting, treating, coating, or a combination thereof. Alternate embodiments are devoid of finishing and/or machining, sanding, grit-blasting, cutting, treating, coating, or a combination thereof.

The material 103 used in the forming (step 102) corresponds to the nickel-based layer 107 and the erosion-resistant alloy layer 109 of the shield 101. The erosion-resistant alloy layer 109 is positioned at least partially on the nickel-based layer 107. In further embodiments, one or more additional nickel-based layers are present and/or one or more additional erosion-resistant alloy layers are present. In one embodiment, a first portion of the material 103 used in the forming (step 102) is a nickel-based powder metal or alloy used for forming the nickel-based layer 107 and a second portion of the material 103 is an erosion-resistant alloy for forming the erosion-resistant alloy layer 109. Suitable erosion-resistant alloys include cobalt-based alloys, chromium-based alloys, tungsten-based alloy, chromium carbide materials, or combinations thereof. In one embodiment, the erosion-resistant alloy is a member of the STELLITE® family of alloys.

The nickel-based layer 107 is any suitable thickness capable of conferring desired properties. For example, in one embodiment, the thickness of the nickel-based layer 107 is selected to provide a sufficient transition between a substrate 203 (see FIG. 2) of the component 201 (see FIG. 2) and the erosion-resistant alloy layer 109, thereby reducing or eliminating delamination, fatigue, welding difficulties, crack propagation, and/or other undesirable effects. For example, in one embodiment, the nickel-based layer 107 provides a barrier limiting carbon migration between the substrate 203 and higher carbon material in the erosion-resistant alloy layer 109, thereby reducing or eliminating weakening of a weld or heat affected zone. Suitable thicknesses of the nickel-based layer 107 include, but are not limited to, between about 10 mils and about 200 mils, between about 10 mils and about 100 mils, between about 10 mils and about 50 mils, between about 10 mils and about 20 mils, between about 50 mils and about 100 mils, between about 50 mils and about 150 mils, between about 50 mils and about 200 mils, between about 100 mils and about 150 mils, between about 100 mils and about 200 mils, between about 150 mils and about 200 mils, up to about 50 mils, up to about 100 mils, up to about 150 mils, up to about 200 mils, greater than about 10 mils, greater than about 20 mils, greater than about 50 mils, greater than about 100 mils, greater than about 150 mils, at about 10 mils, at about 20 mils, at about 50 mils, at about 100 mils, at about 150 mils, at about 200 mils, or any suitable combination, sub-combination, range, or sub-range thereof.

The erosion-resistant alloy layer 109 is any suitable thickness conferring desired properties. In one embodiment, the thickness of the erosion-resistant alloy layer 109 is selected to confer a sufficient wear resistance and/or erosion-resistance, for example, over a predetermined life of a specific component/use. Suitable thicknesses of the erosion-resistant alloy layer 109 include, but are not limited to, between about 200 mils and about 500 mils, between about 200 mils and about 300 mils, between about 200 mils and about 400 mils, between about 300 mils and about 400 mils, between about 300 mils and about 500 mils, between about 400 mils and about 500 mils, up to about 200 mils, up to about 300 mils, up to about 400 mils, up to about 500 mils, greater than about 200 mils, greater than about 300 mils, greater than about 400 mils, at about 200 mils, at about 300 mils, at about 400 mils, at about 500 mils, or any suitable combination, sub-combination, range, or sub-range thereof.

Figure 2:
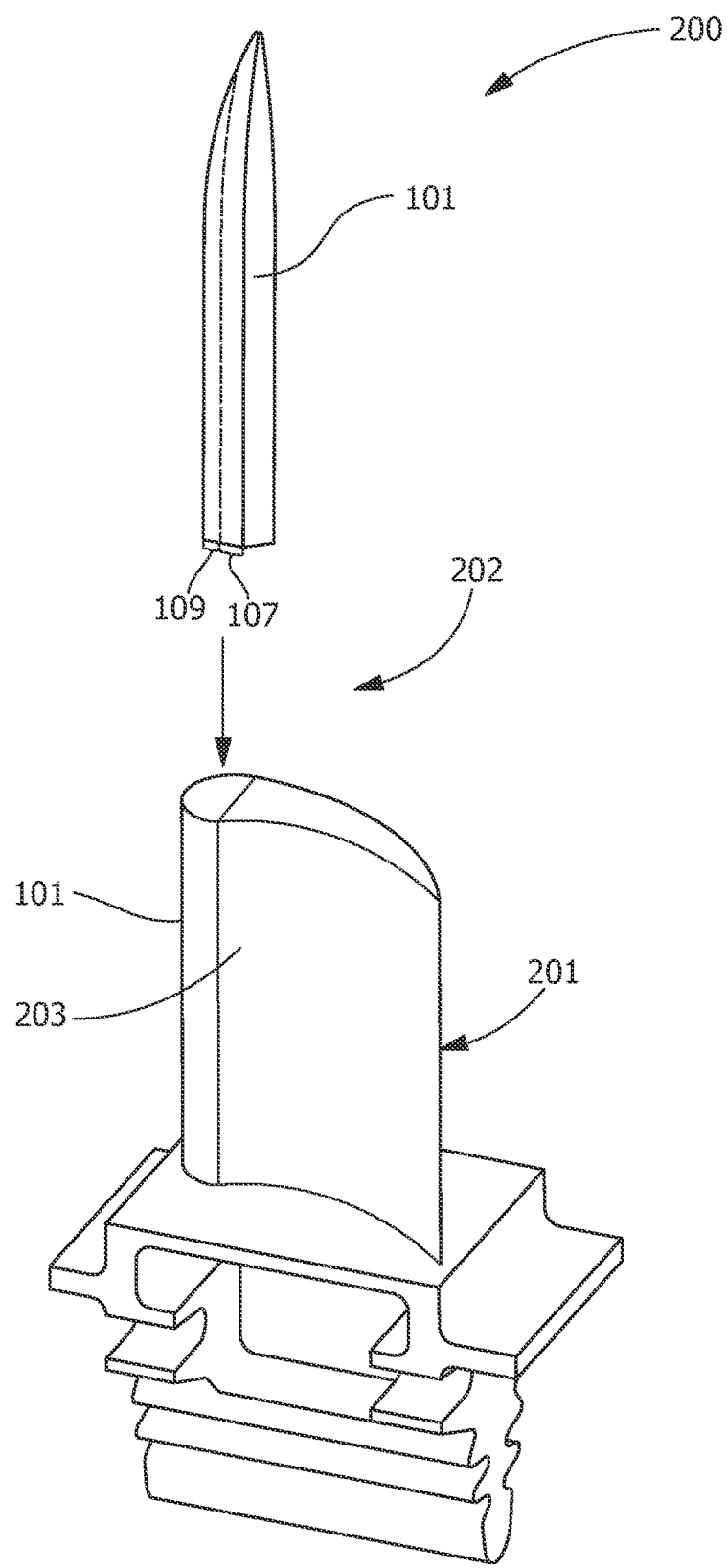
FIG. 2 is a perspective schematic view of an exemplary preparation process to produce an exemplary turbine component according to the disclosure.

FIG. 2 represents an embodiment of a preparation process 200 for preparing the component 201, such as a turbine component. Suitable components capable of being protected by the shield 101 include, but are not limited to, a blade or airfoil, a nozzle, a valve, a diaphragm, a bucket, a rotor, or a combination thereof.

The preparation process 200 for preparing the component 201 includes securing (step 202) the shield 101 to the substrate 203 of the component 201. In one embodiment, the substrate 203 is an iron-based or nickel-based alloy. One suitable alloy has a composition, by weight, of about 0.15% carbon, about 1.00% manganese, about 0.50% silicon, between about 11.5% and about 13.0% chromium, about 0.04% phosphorus, about 0.03% sulfur, and a balance of iron. Another suitable alloy has a composition, by weight, of about 0.14% carbon, about 0.80% manganese, about 0.015% phosphorous, about 0.010% sulfur, about 0.2% silicon, about 11.5% chromium, about 2.5% nickel, about 1.6% molybdenum about 0.3% vanadium, about 0.03% nitrogen and a balance of iron. Another suitable alloy has a composition, by weight, of about 0.050% carbon, between about 14.0% and about 16.0% chromium, between about 1.25% and about 1.75% copper, about 1.0% manganese, between about 0.50% and about 1.0% molybdenum, between about 5.0% and about 7.0% nickel, about 0.30% phosphorus, about 1.0% silicon, about 0.030% sulfur, and a balance of iron. In one embodiment, the securing (step 202) includes positioning the shield 101 onto the substrate 203 opposite the erosion-resistant alloy layer 109. In one embodiment, the securing (step 202) is by a technique selected from the group consisting of brazing, laser welding, electron beam welding, plasma welding, tungsten inert gas welding, and combinations thereof.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A fabrication process comprising:
    forming a near-net shape shield to a near-net shape within a die, the near-net shape having a geometry and a size requiring little or no machining or processing;
    wherein the near-net shape shield includes a nickel-based layer and an erosion-resistant alloy layer positioned at least partially on the nickel-based layer;
    wherein, prior to attachment to a component, the nickel-based layer is configured to facilitate secure attachment of the near-net shape shield to a surface of the component; and
    wherein the geometry of the near-net shape comprises at least one feature selected from the group consisting of cavities, protrusions, gaps, and combinations thereof.

2. The process of claim 1, wherein the forming of the near-net shape shield to the near-net shape within the die comprises die casting.

3. The process of claim 1, wherein the nickel-based layer has a thickness of between about 10 mils and about 200 mils.

4. The process of claim 1, wherein the erosion-resistant alloy layer has a thickness of between about 200 mils and about 500 mils.

5. The process of claim 1, wherein the near-net shape requires no machining or processing after forming the near-net shape shield within the die.

6. The process of claim 1, wherein the at least one feature corresponds with at least a portion of the component.

7. The process of claim 1, wherein the forming of the near-net shape shield to the near-net shape within the die comprises positioning powder within the die.

8. The process of claim 7, wherein the forming of the near-net shape shield to the near-net shape within the die further comprises pressing the powder within the die.

9. The process of claim 7, wherein the forming of the near-net shape shield to the near-net shape within the die further comprises sintering the powder within the die.

10. The process of claim 1, further comprising securing the nickel-based layer onto an iron-based or nickel-based substrate of the component.

11. The process of claim 10, wherein the component is at least a portion of a turbine component.

12. The process of claim 10, wherein the securing is by a technique selected from the group consisting of brazing, laser welding, electron beam welding, plasma welding, tungsten inert gas welding, and combinations thereof.

* * * * *